(12) United States Patent
Halamish et al.

(10) Patent No.: US 10,084,994 B2
(45) Date of Patent: Sep. 25, 2018

(54) LIVE STREAMING VIDEO OVER 3D

(71) Applicant: Verint Systems Ltd., Herzilya Pituach (IL)

(72) Inventors: Tal Halamish, Petah Tikva (IL); Stanislav Fridland, Herzilya Pituach (IL); Yaron Avraham, Herzilya Pituach (IL); Odid Cohen, Herzilya Pituach (IL)

(73) Assignee: Verint Systems Ltd., Herzliya Pituach (IL)

( * ) Notice: Subject to any disclaimer, the term of this patent is extended or adjusted under 35 U.S.C. 154(b) by 431 days.

(21) Appl. No.: 14/104,147

(22) Filed: Dec. 12, 2013

(65) Prior Publication Data

US 2014/0160251 A1   Jun. 12, 2014

Related U.S. Application Data

(60) Provisional application No. 61/736,447, filed on Dec. 12, 2012.

(51) Int. Cl.
*H04N 7/18* (2006.01)
*H04N 13/275* (2018.01)
*G06T 19/00* (2011.01)
*H04N 13/156* (2018.01)

(52) U.S. Cl.
CPC ........... *H04N 7/181* (2013.01); *G06T 19/006* (2013.01); *H04N 13/156* (2018.05); *H04N 13/275* (2018.05)

(58) Field of Classification Search
CPC ..... G06T 19/00; H04N 13/0239; H04N 7/181
USPC .............................. 348/47, 143, 157; 345/419
See application file for complete search history.

(56) References Cited

U.S. PATENT DOCUMENTS

| | | | |
|---|---|---|---|
| 8,253,797 B1* | 8/2012 | Maali | G06T 7/73 345/419 |
| 2003/0085992 A1* | 5/2003 | Arpa | G06T 7/0024 348/47 |
| 2004/0246336 A1* | 12/2004 | Kelly, III | G06K 9/00771 348/143 |
| 2005/0024206 A1* | 2/2005 | Samarasekera | G08B 13/19645 340/541 |
| 2006/0279630 A1* | 12/2006 | Aggarwal | G01S 3/7864 348/143 |

(Continued)

*Primary Examiner* — Mishawn Hunter
(74) *Attorney, Agent, or Firm* — Meunier Carlin & Curfman (57) ABSTRACT

A video monitoring system and method comprises a first camera at a first camera location configured to video record a first monitored area, wherein a georeference location of the first monitored area is known, and a virtual 3D model of the monitored zone that includes the first camera location and the first monitored area, wherein the virtual 3D model is georeferenced to a physical location. The system further comprises a processor configured to receive the video recording of the first monitored area and to overlay the video recording of the first monitored area onto a part of the virtual 3D model that corresponds to the georeference location of the first monitored area. A display is also connected to the processor and configured to display the virtual 3D model of the monitored zone overlaid with the video recording of the first monitored area.

19 Claims, 4 Drawing Sheets
(3 of 4 Drawing Sheet(s) Filed in Color)

(56) References Cited

U.S. PATENT DOCUMENTS

| | | | |
|---|---|---|---|
| 2007/0247525 A1* | 10/2007 | Samarasekera | G06T 15/205 348/159 |
| 2008/0062167 A1* | 3/2008 | Boggs | G06F 17/5004 345/419 |
| 2009/0141966 A1* | 6/2009 | Chen | G06T 7/0028 382/154 |
| 2009/0225164 A1* | 9/2009 | Renkis | G08B 13/19656 348/143 |
| 2009/0315978 A1* | 12/2009 | Wurmlin | G06T 5/005 348/43 |
| 2010/0026809 A1* | 2/2010 | Curry | H04N 5/222 348/157 |
| 2011/0115909 A1* | 5/2011 | Sternberg | G01S 3/7864 348/143 |
| 2012/0120113 A1* | 5/2012 | Hueso | G06T 19/006 345/672 |
| 2012/0262552 A1* | 10/2012 | Zhang | G06F 17/30855 348/47 |
| 2013/0162632 A1* | 6/2013 | Varga | G06T 19/006 345/419 |
| 2014/0063055 A1* | 3/2014 | Osterhout | G06F 3/005 345/633 |

* cited by examiner

Fig. 3

Fig. 4

LIVE STREAMING VIDEO OVER 3D

CROSS-REFERENCE TO RELATED APPLICATION

The present application claims priority of U.S. Provisional Patent Application No. 61/736,447, filed on Dec. 12, 2012, the content of which is hereby incorporated herein by reference in its entirety.

BACKGROUND

Prior art monitoring systems and methods, such as security monitoring systems and methods, provide the ability for a user to monitor video surveillance of a particular area, including monitoring live streaming video and monitoring video from more than one camera simultaneously. However, prior art monitoring systems and methods only provide video feed to a user, and fail to provide contextual information that would allow a user to interpret the video feed within the larger surrounding context. For example, prior art video surveillance systems do not provide spatial context for the user, which puts the monitored area appearing in the one or more video feeds in perspective within the larger area in which it exists. Thus, a user of such prior art monitoring systems may have difficulty understanding or visualizing the monitored video in the context of the surrounding area that is not captured on video.

Modeling software is available offering virtual 3-dimensional (3D) models of physical locations and areas. Further, some prior art 3D modeling systems offer intuitive 3D multi-layer user interfaces, wherein a user can navigate the 3D modeled space. Some prior art security monitoring systems leverage such 3D modeling to offer situational awareness and response information and/or training or contingency planning capabilities, such as developing and testing plans for execution during natural disasters or other calamities. One exemplary such prior art system is the Nextiva PSIM (Physical Security Information Management) by Verint. Nextiva PSIM enables various phases of an incident management cycle, facilitates enhanced situational awareness and response, and is based on an open and scalable architecture.

SUMMARY

The present inventors recognize that combining video surveillance with virtual 3D modeling could offer improved video monitoring capabilities, as the 3D model offers a contextual interface providing situational awareness to a user and improved ability to understand and interpret surveillance video(s). The present inventors further recognized that georeferencing techniques could be employed to overlay video feed, such as a live surveillance video, on top of a 3D model to provide a user with a true-to-life image of the area surrounding the videoed location.

Accordingly, one embodiment of the invention provides a video monitoring system including a first camera at a first camera location configured to video record the first monitored area, wherein a georeference location of the first monitored area is known. The system further includes a virtual 3D model of a monitored zone, wherein the zone includes the first camera location and the first monitored area, and wherein the virtual 3D model is georeferenced to a physical location of the zone. For example, each pixel of the virtual 3D model may be georeferenced to a corresponding coordinate location in 3D space of a point in a zone. The video monitoring system further includes a processor configured to receive the video recording of the first monitored area and to overlay the video recording of the first monitored area onto a part of the virtual 3D model that corresponds to the georeferenced location of the first monitored area. The system also has a display connected to the processor and configured to display the virtual 3D model of the monitored zone overlaid with the video recording of the first monitored area.

The processor may also be configured to receive input from a user via a user interface device and to adjust the virtual 3D model displayed on the user interface display according to the user input. Further, the processor may be configured to overlay a first camera location marker on the virtual 3D model at a point corresponding to the georeference location of the first camera location. Likewise, the processor may be further configured to overlay a first monitored area marker on the virtual 3D model to designate the first monitored area. The video monitoring system may further comprise a second camera at a second camera location configured to video record a second monitored area, wherein a georeference location of the second monitored area is also known. In such an embodiment, the processor is further configured to receive the video recording of the second monitored area and to overlay the video recording of the second monitored area onto a part of the virtual 3D model that corresponds to the georeference location of the second monitored area.

Another embodiment provides a method of monitoring an area including the steps of video recording a first monitored area with a first video camera at a first camera location and determining georeference coordinates for the first monitored area. A virtual 3D model of a monitored zone is accessed with a processor, wherein the monitored zone includes the first camera location and the first monitored area and wherein the virtual 3D model is georeferenced to a physical location of the monitored zone. The method further includes overlaying the video recording of the first monitored area onto the virtual 3D model using the processor, wherein the video recording of the first monitored area is overlaid on the part of the virtual 3D model that corresponds to the georeference coordinates for the first monitored area. The virtual 3D model of the monitored zone overlaid with the video recording of the first monitored area is then displayed on a display.

In one embodiment, each pixel of the virtual 3D model is georeferenced to a coordinate location in three-dimensional space. Likewise, the step of determining the georeference coordinates for the physical location of the first monitored area may include displaying the coordinate location in three-dimensional space to each pixel of the video recording of the first monitored area. The video recording of the first monitored area may be streamed live from the first video camera to the processor, and the step of overlaying video recording of the first monitored area onto the virtual 3D model may include continuously overlaying the streamed live video onto the virtual 3D model.

The method may further include the steps of video recording the second monitored area with a second video camera at a second camera location and determining georeference coordinates for the second monitored area. In such an embodiment, the monitored zone further includes the second camera location and the second monitored area, and the step of overlaying the video recording further includes overlaying the video recording of the second monitored area onto a part of the virtual 3D model that corresponds to the georeference coordinates for the second monitored area. The method may further include determining georeference coordinates for the first camera location and a second camera location and overlaying camera location markers on part of the virtual 3D model that corresponds to the georeference coordinates for the first camera location and the second camera location. The camera location markers may be selectable by a user via a user interface device, and the method may further include overlaying the video recording of the first monitored area and the second monitored area onto the virtual 3D model based on the camera location marker selected by a user.

In another embodiment, a computer system having a graphical user interface including a display and a user input device receives a recording of a first monitored area, wherein the georeference coordinates of the first monitored area are known, and accesses and displays a virtual 3D model of a monitored zone on the display. The monitored zone includes the first monitored area, and the virtual 3D model is georeferenced to a physical location of the monitored zone. The system receives a input from a user via a user input device to navigate in the virtual 3D model and controls the virtual 3D model in response to the input from the user. The video recording of the first monitored area is overlayed onto the virtual 3D model when the portion of the 3D model associated with the first monitored area is displayed, wherein the video recording of the first monitored area is overlaid on the part of the 3D model corresponding to the georeferenced coordinates for the first monitored area.

Various other features, objects and advantages of the invention will be made apparent from the following description taken together with the drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee. In the drawings.

DETAILED DESCRIPTION

Figure 1:
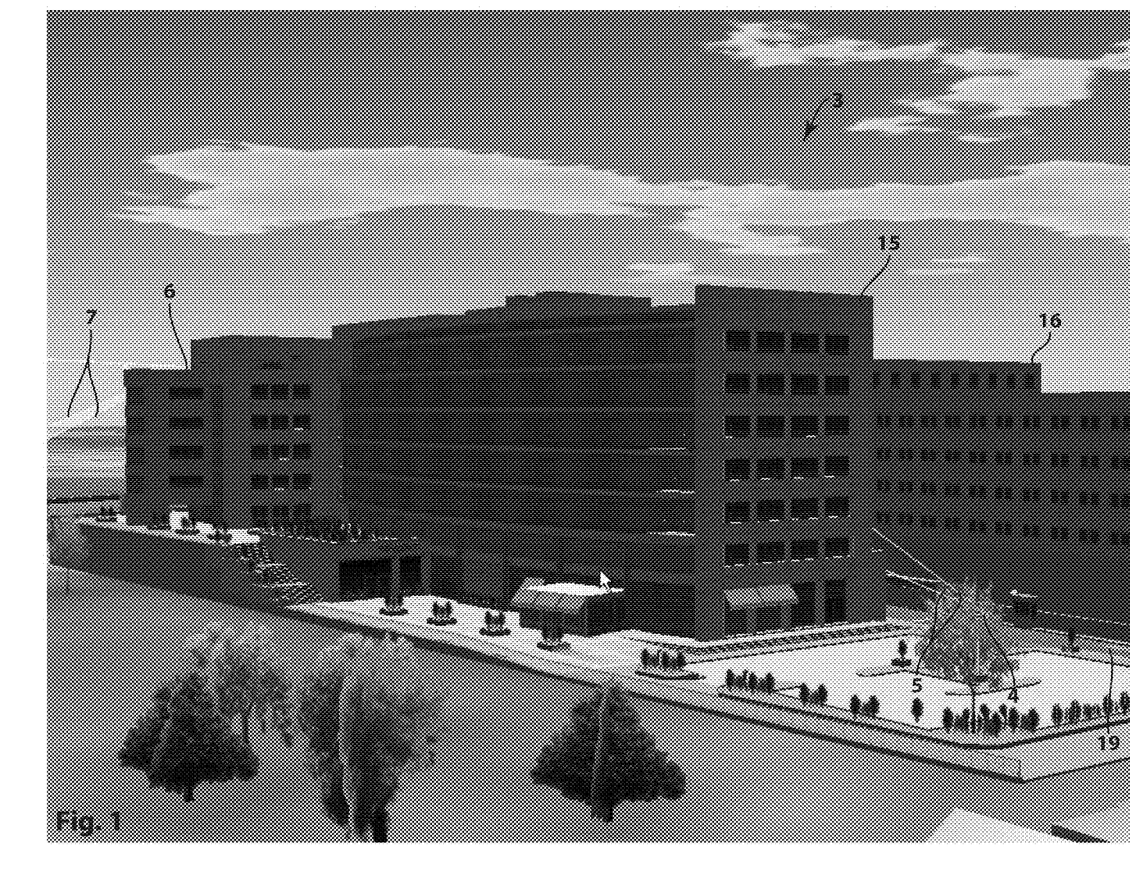
FIG. 1 depicts a screen shot of an exemplary embodiment of a monitoring system having video over a virtual 3D model.
Figure 2:
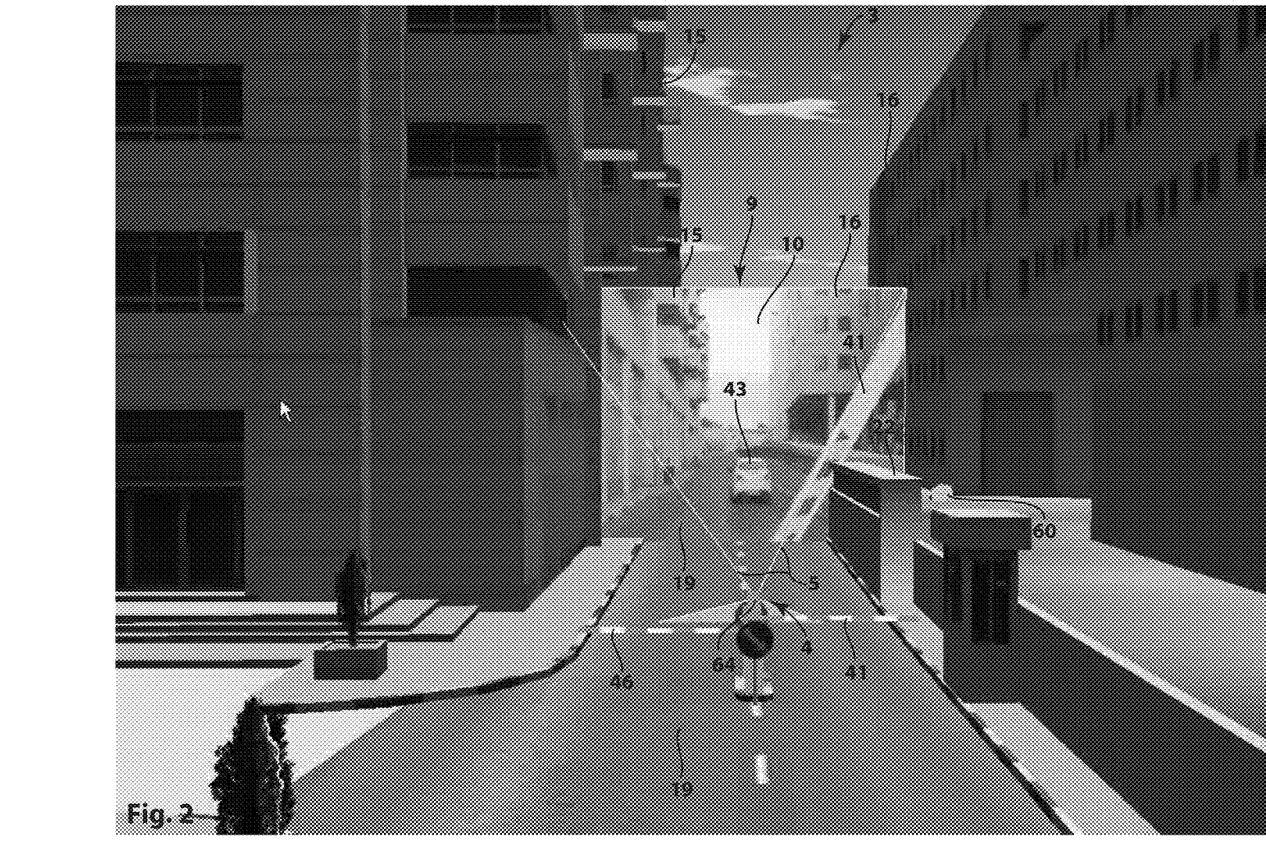
FIG. 2 provides an additional screen shot further depicting of the embodiment of the video monitoring system and method shown in FIG. 1 depicting video over the virtual 3D model.
Figure 3:
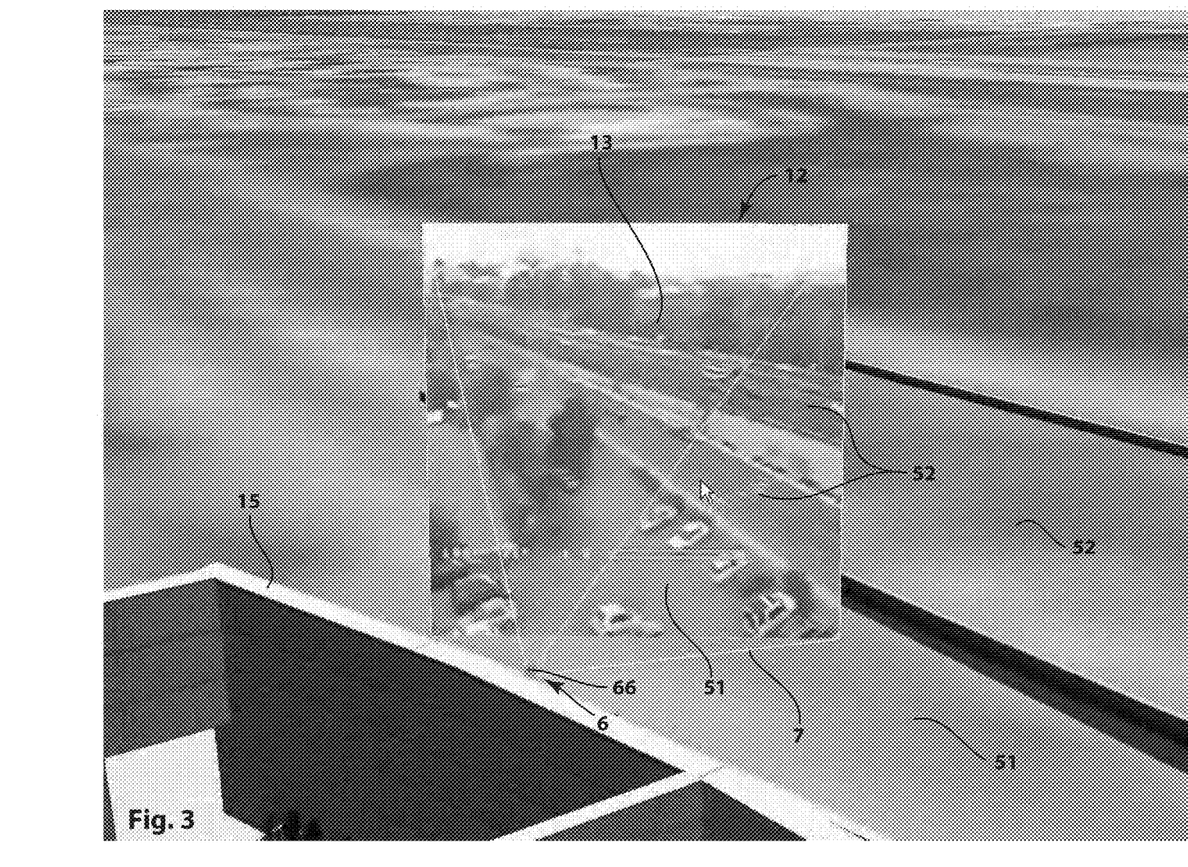
FIG. 3 provides an additional screen shot further depicting a third view of the exemplary monitoring system and method of FIG. 1 depicting video over the virtual 3D model.

FIGS. 1 through 4 depict an embodiment of a monitoring system and method incorporating the present invention. FIGS. 1 through 3 provide screen shots of an exemplary embodiment of a monitoring method and user interface employing video overlaid on a virtual 3D model. As depicted in FIGS. 1 through 3, the user may navigate through the virtual 3D model 3 to view video recordings of certain physical locations represented in the 3D model such as video recording 10 of the first monitored zone 9 and video recording 13 of the second monitored zone 12.

In FIG. 1, a monitored zone is replicated in the virtual 3D model 3, only a portion of which is depicted in the screen shot. One or more video cameras are placed in the physical location of the monitored zone. The virtual 3D model in FIG. 1 is overlaid with trace lines 5 and 7 depicting the locations and view angles of two cameras. The first set of trace lines 5 indicates the first camera location 4 and the view angle, or view area, of the first camera at that location. A second set of trace lines 7 indicate a second camera location 6 and the view angle of the second camera at that location. As is further illustrated in FIGS. 2 and 3, the first camera location 4 is at a security gate along the roadway 19 and the second camera location 6 is on the back end of building 15, with the camera angled towards the parking lot and roadway behind building 15.

The virtual model 3 of FIG. 1 depicts a virtual replica of the physical location. The replica of the monitored zone, or area, may include replication of significant details of the physical location of the monitored zone, including accurate and scaled representations of the building structures, sidewalks, stairs, plants, etc. For example, the screen shot in FIG. 1 includes a modeled first building 15 in the forefront and a second building 16 in the rear. The model also replicates the colors of the physical location, for example, as they would appear in daylight. As explained in more detail below, elements depicted in the virtual 3D model 3 are assigned coordinates of the corresponding physical location, such as by Cartesian coordinates in x, y, z space.

The user may navigate through the virtual 3D model 3 of the monitored zone in order to view video recordings of various monitored areas. To navigate through the virtual 3D model 3, a user may use any user interface device, such as a touch screen, mouse, keyboard, a joy stick, etc. The video recording may be overlaid on the virtual 3D model 3 using any number of techniques. For example, as seen in FIGS. 1 through 3, the video recordings 10 and 13 may be displayed in a realistic way, where the video recordings are only visible when the user navigates to a point in the model which corresponds to a physical location in which the respective monitored area would physically be visible. Namely, the first monitored area 9 is not visible in FIG. 1 because it is obstructed by building 15.

FIG. 2 depicts a screen shot of the monitoring system with overlaid video recording 10 of the first monitored area 9 from the camera at the first camera location 4. Also overlaid on the 3D model 3 is a first camera location marker 64, as well as the trace lines 5 showing the view angle of the first camera at the first camera location 4. The marker 64 designating the first camera location 4 is a green rectangle. In the embodiment depicted in FIG. 2, the green rectangle marker indicates that the video taken by the camera at that location is currently playing—i.e., being overlaid on the 3D model. An additional camera location 60 within the field of view of the 3D model 3 depicted in FIG. 2 is designated with a yellow rectangle, indicating that the video from the cameras at that location is not currently being displayed. In other embodiments, different camera designators and/or different colors may be employed to indicate camera location and/or video activity. For example, in one embodiment (not shown) the location of monitored areas, such as the first monitored area 9, may be outlined or otherwise demarcated rather than indicating or marking the camera location.

The video recording(s) of the monitored area(s), such as the video recording 10, may be continuously displayed on the virtual 3D model 3, or they may be selectively displayed upon input by a user. In one embodiment, the video recordings of one or more cameras in the system are automatically displayed when the corresponding portion of the 3D model is displayed. In another embodiment, the user navigating through the 3D model 3 may then select to view a video recording of a particular monitored area. In this embodiment, the user may select one or more camera locations via the markers 64, 60 from which the video will be played. As described in more detail below, the video recording may be live streaming video, or may be a stored video recording from a particular time in history.

In the screen shot depicted in FIG. 2, the video recording 10 of the first monitored area 9 depicts a security gate in the roadway 19. The security gate comprises an entrance gate 41 and an exit gate 46. The overlaid video depicts a car 43 traveling along the roadway 19 having just entered the entrance gate 41. The entrance gate 41 is in the process of closing.

The trace lines 5 in FIG. 2 mark the camera angle, or area recorded by the first camera. The trace lines 5 extend from the first camera location marker 64 to the exterior corners of the first monitored area 9. The trace lines 5 form a pyramid shape, with the apex of the pyramid at the first camera location 4 and the base of the pyramid at the first monitored area 9. The video of the first monitored area 10 is overlaid at the base of the pyramid. For example, the entrance gate 41 only appears in the video recording 10 when the first entrance gate 41 extends up far enough to be inside the view angle demarcated by the trace line 5.

As can be seen in FIG. 2, the video of the first monitored area 10 is overlaid on the virtual 3D model corresponding to the location of the first monitored area in connection with the 3D model. For example, the first building 15 in the virtual 3D model aligns with the first building 15 in the video recording of the first monitored area 10. The same is true for the second building 16 aligning between the video recording 13 and the virtual 3D model 3. Likewise, the road 19 aligns, with the video recording 10 providing a continuation of the virtual 3D model of the road 19. In some embodiments, one or more portions of the video recording 9 of the first monitored area 10 may be omitted from the overlaid video displayed. For example, portions of the video may be omitted from the overlay if the normal, physical viewing angle depicted by the 3D model 3 would not allow view of that portion of the monitored area—e.g. from the depicted view location of the 3D model that portion of the monitored area is obstructed, such as by a wall. For example, in the view of FIG. 2 the wall 22 is shown obstructing a portion of the video recording 10. However, if a user navigating the 3D model 3 shown in the screen shot of FIG. 2 were to zoom in towards the first monitored area 9, the wall would obstruct less of the video recording 10. Likewise, if the user were to navigate upwards the wall would obstruct less of the video.

FIG. 3 depicts a screen shot of another aspect of the embodiment depicted in FIG. 1, which includes the second monitored area 12 and the virtual 3D model 3 of the surrounding area. The video recording 13 of the second monitored area 12 is overlaid on the 3D model in accordance with the georeference coordinates of the second monitored area 12 and the 3D model 3, such that the video recording 13 of the second monitored area 12 is overlaid on and aligns with the corresponding area of the 3D model 3. For example, the parking lot 51 of the 3D model aligns with the video recorded parking lot 51 in the video. Likewise, the highway 52 of the 3D model aligns with the highway 52 in the video recording 13.

The second monitored area 12 is monitored by a camera at the second camera location 6, which is marked by the second camera location marker 66. Referring back to FIG. 1, the second camera location 6 is on the back end of the building 15, which is depicted in the view of the 3D model shown in FIG. 3. The view angle of the camera at the second camera location 6 is shown by trace lines 7. The monitored area 12 is a rectangular area, and the view angle of the camera filming that area forms a pyramid shape with a base formed by the second monitored area 12 and an apex at the second camera location 6. Also, like FIG. 2, the second camera location marker 66 designates the second camera location 6 with a green rectangle demonstrating that the video recording 13 from the camera at that location is being displayed.

The monitored area depicted in FIG. 3 is a primarily on a flat horizontal ground surface. Thus, in some embodiments, the overlaid video may be rotated vertically so that it can be seen from a horizontal angle, such as from the ground surface in the 3D model. Alternatively or additionally, the apparent shape of the second monitored area 12 may be adjusted depending on the angle from which it is viewed. Likewise, the trace lines may adjust depending to correspond to the user's view angle. For example, the trace line 7 in FIG. 3 extends to the second camera location, which is towards the left of the video recording 13 image. If the user were to navigate through the 3D model to a different location, the lines would shift in proportion to the movement through the virtual 3D model 3.

The first and second monitored areas 9 and 12 shown in FIGS. 2 and 3 are generally rectangular in shape. However, the monitored area could be any shape, and may depend on the image captured by the respective camera. For example, the monitored area may be circular, ovular, or may take the shape of any polygon. Likewise, the trace lines 5 and 7 depicted in FIGS. 1-3 could take on any form that may designate the camera location and/or the location of the monitored area. For example, the one or more camera locations could be designated with a dot or a flag that would indicate the location of the camera. Alternatively or additionally, a line could extend from the center of the video recording of a monitored area to the respective camera location to highlight the view angle of the camera and or designate the camera location. In still other embodiments, the view area of the camera could be highlighted, which would indicate the area in 3D space recorded by the camera. In still further embodiments, the camera location and/or view angle of the camera is not shown at all. In such embodiments, the monitored area(s) and/or the video recording of the monitored area(s) may be the only designation on the virtual 3D model 3.

Both the 3D model and the video recording of the monitored areas may be georeferenced to define their existence in physical space. That is, establishing their location in terms of map projections and/or coordinate systems. A map projection is a systematic transformation of the latitudes and longitudes of locations on the surface of a sphere or an irregular shaped into locations on a plane—i.e., the representation on a plane surface of any part of the surface of the earth. A coordinate system is a system which uses one or more numbers or coordinates to review for the time and position of a point or other geometric element in space. For example, a coordinate system may be the Cartesian coordinate system, and may be defined on a 2D plane (e.g., x and y) or in 3D space (e.g., x, y, and z). For example, the perpendicular planes (x, y, and z) may be chosen and every point defined as a distance, or a value, with respect to each of the planes. In an alternative embodiment, a polar coordinate system is used, wherein each point on a plane is determined by a distance from a fixed point and an angle from a fixed direction. Similarly, a cylindrical coordinate system may be used, which specifies point positions by the distance from a chosen reference axis.

The virtual 3D model 3 and the video recordings may be georeferenced in any way known in the art. For example, the virtual 3D model may be georeferenced by assigning reference coordinates to each pixel of the model connecting that pixel to a corresponding point in the monitored zone. The video recordings may be georeferenced by connecting at least a portion of the recorded video to reference coordinates of a corresponding point in the monitored area. For example, each pixel of each frame of the video recordings may be assigned reference coordinates. Alternatively, only a portion of each frame may be assigned reference coordinates, such as the circumference of the monitored area or the corner points and/or the center point of the monitored area. In still other embodiments, the video recording is not directly assigned any georeference locations. Instead, the georeference coordinates of the monitored location are known, or predetermined, and the software module is configured to overlay the video on the 3D model at the location of those coordinates.

In one embodiment, the 3D model is geo-referenced to a real world coordinate location. The video recording(s) of the monitored area(s) are then placed on the 3D model (as a separate layer) in their specific coordinate location(s). The placement, or setting, of the video recording(s) on the 3D model may be performed manually by an operator. Alternatively, a spreadsheet containing the coordinates of the camera location(s) and/or the monitored area(s) may be imported. The spreadsheet may also contain other information, such as camera type, direction, image parameters, etc., that may be helpful in rendering and overlaying the video recording on the virtual 3D model. Once the video recording layer is set, an operator may further adjust the video recordings to fit within, or match, the virtual 3D model. Alternatively or additionally, the operator may adjust the 3D model parameters to fit or match the video recording.

Preferably, the virtual 3D model 3 and the video recordings 10 and 13 are referenced using the same georeferencing system. However, if different projection systems are used for georeferencing different images and/or models, tools may be employed to convert the images to the same projection systems and/or to overlay the images with minimum distortion.

As seen in FIGS. 1 through 3, the virtual 3D model 3 provides a context in which the video recordings 10 and 13 of the first and second monitored areas 9 and 12 can be displayed. For example, FIG. 1 demonstrates the location of the first monitored area 9 and the second monitored area 12 with respect to one another and with respect to the building 15, surrounding streets, etc. Thus, the virtual 3D model 3 provides the users with additional information not conveyed through simply watching the video recordings 10 and 13 alone. The virtual 3D model 3 provides information about the locations surrounding the monitored areas, and provides information about the monitored areas with respect to one another. Referring to FIG. 2, for example, the virtual 3D model 3 provides information about the areas surrounding the roadway 19 captured in the video. For example, viewing the video recording 10 of the first monitored area 9 in context of the surrounding virtual 3D model 3, the user can understand that the car 43 has just passed through the entrance gate 41 which is between the building 15 and 16. Furthermore, the user can navigate through the virtual 3D model 3 to glean further information about the context surrounding the video recording.

In the embodiment of FIGS. 1 through 3, the video recording 10 of the first monitored area 9 is overlaid onto the virtual 3D model 3 in a realistic way, where the video recording 10 is not visible unless the user navigates around the building 15 toward the first monitored area 9. However, in another embodiment, the video recording 10 of the first monitored area 9 may be overlaid on the 3D model such that some or all of the video recording could be visible from all locations, such as displaying a portion of the building 15 as transparent, or overlaying the first video recording 10 on top of the building 15. Likewise, the second monitored area 12 is out of the field of view of the screen shot in FIG. 1. Thus, in the embodiment depicted in FIG. 1, the video recording 13 of the second monitored area is not shown, and is only indicated by the trace lines 7. However, in another embodiment, the video recording 13 of the second monitored area 12 may be displayed, for example, tilted vertically so that it can be seen from the viewpoint depicted in FIG. 1. Alternatively, the video may be displayed at another location all together, such as in the upper left hand corner of the display screen so that the user can view the video recording 13 even when the second monitored area 12 is slightly out of view. In such an embodiment, the video of the second monitored area could further have an arrow or other indicator to indicate to the user the general location of the second monitored area 12.

Figure 4:
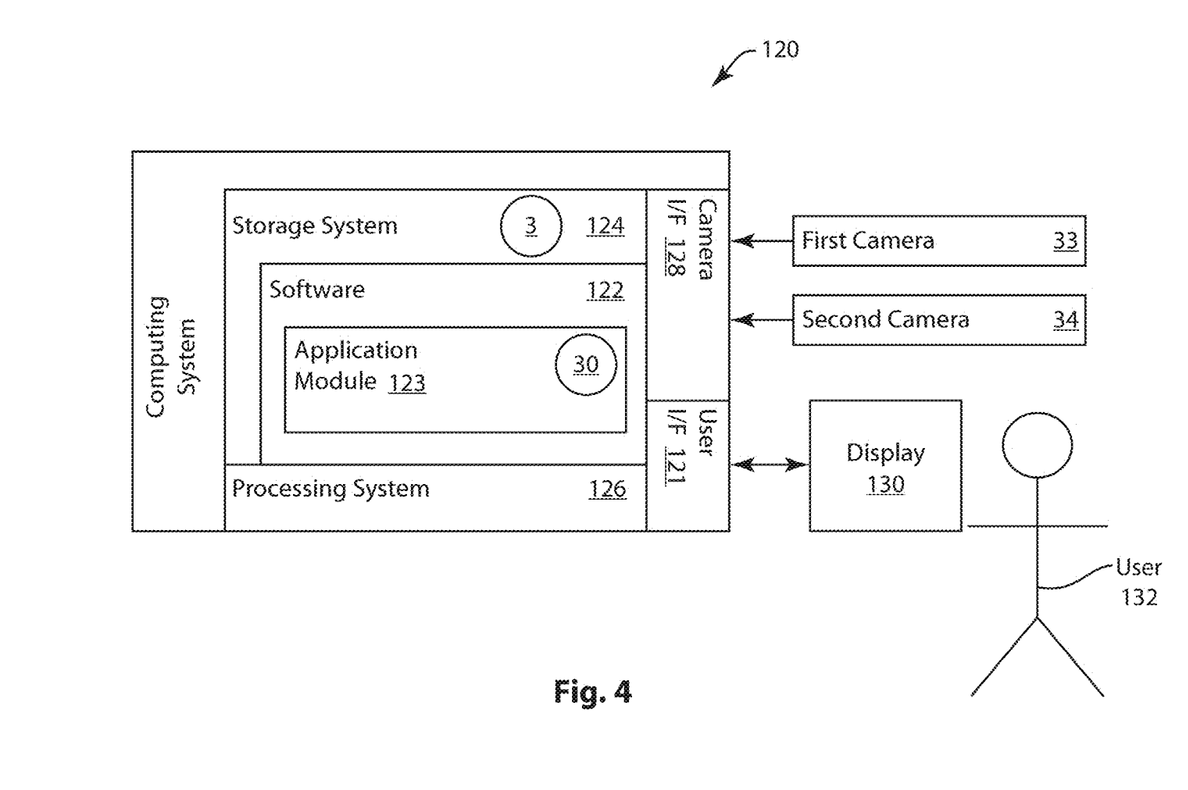
FIG. 4 depicts an architecture of an exemplary monitoring system and method.

FIG. 4 is a system diagram of an exemplary embodiment of a video monitoring system 1 implementing a virtual 3D model 3 and a video overlay module 30 to provide and display the virtual 3D model of the monitored zone overlaid with the video recording of one or more monitored areas. As explained herein, the video overlay module 30 overlays a video recording of a monitored area onto a part of the virtual 3D model that corresponds to the georeferenced location of that monitored area. The computing system 120 generally includes a processing system 126, storage system 124, software 122, camera interface 128 and a user interface 121. The processing system 126 loads and executes software 122 from the storage system 124, including a software application module 123. When executed by the computing system 120, software module 123 directs the processing system 126 to operate as described to execute the methods described herein, including execution of the video overlay module 30. The software application module 123 also directs the processing system 126 to access the virtual 3D model 3 from the storage system 124.

Although the computing system 120 as depicted in FIG. 2 includes only one exemplary software module in the present example, it should be understood that any number of software modules can be included, and that the operations described with respect to the representative module could be provided by a single module or by any number of additional modules. Similarly, while the description as provided herein refers to a computing system 120 and a processing system 126, it is to be recognized that implementations of such systems can be performed using one or more processors, which may be communicatively connected, and such implementations are considered to be within the scope of the description.

The processing system 126 can comprise a microprocessor and other circuitry that retrieves and executes software 122 from storage system 124. Processing system 126 can be implemented within a single processing device but can also be distributed across multiple processing devices or subsystems that cooperate in existing program instructions. Examples of processing system 126 include general purpose central processing units, applications specific processors, and logic devices, as well as any other type of processing device, combinations of processing devices, or variations thereof.

The storage system 124 can comprise any storage media readable by processing system 126, and capable of storing software 122. The storage system 124 can include volatile and non-volatile, removable and non-removable media implemented in any method or technology for storage of information, such as computer readable instructions, data structures, program modules, or other data. Storage system 124 can be implemented as a single storage device but may also be implemented across multiple storage devices or sub-systems. Storage system 124 can further include additional elements, such a controller capable, of communicating with the processing system 126.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to storage the desired information and that may be accessed by an instruction execution system, as well as any combination or variation thereof, or any other type of storage medium. In some implementations, the storage media can be a non-transitory storage media. In some implementations, at least a portion of the storage media may be transitory. It should be understood that in no case is the storage media a propagated signal.

User interface 121 communicates and/or controls any number of user interface devices through which the user 132 interfaces with the computing system 124. For example, the display 130 is controlled by the user interface 121 portion of the computing system 120. The display may be a simple output device, or it may also have a user interface component to it, such as a touch screen, or it may provide some other means through which the user 132 can interact with and/or control the computing system 120 and the subsystems therein. For example, in one preferred embodiment, the user 132 interacts with and controls the display 130 via a joystick. Alternatively or additionally, the display 130 and the user interface 121 may further be integrated with a mouse, a keyboard, a voice input device, a touch input device for receiving a gesture from a user, a motion input device for detecting non-touch gestures and other motions by a user, and other comparable input devices and associated processing elements capable of receiving user input from the user 132. Speakers, printers, haptic devices and other types of output devices may also be integrated in the user interface 121.

The computing system 120 receives video recording data from the first and second cameras 33 and 34 through the camera communication interface 128. The camera communication interface 128 may be a wireless interface that receives wireless data directly or indirectly from the first and second cameras 33 and 34. Though the interface can be any data transfer interface known in the art. The image data may be in any format. The image file format may exemplarily be in .avi file format. Furthermore, as described herein, the video recording data may include georeference data describing the physical location of the monitored area appearing in the video recording.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A video monitoring system, the video monitoring system comprising:
    a first camera at a first camera location configured to provide a video stream of a first monitored area, wherein a georeference location of the first monitored area is known;
    a virtual 3D model of a monitored zone that includes the first camera location and the first monitored area, wherein the virtual 3D model is georeferenced to a physical location of the zone;
    a processor configured to receive the video stream of the first monitored area and access the virtual 3D model, wherein the processor establishes georeferenced locations of the video stream pixels on the 3D model and overlays on a continuous pixel by pixel basis, the video stream of the first monitored area onto a part of the virtual 3D model that corresponds to the georeferenced location of the first monitored area; and
    a display connected to the processor and configured to display the virtual 3D model of the monitored zone overlaid with the video stream of the first monitored area.

2. The system of claim 1, wherein the virtual 3D model is interactive; and
    wherein the processor is configured to receive the input from the user via a user interface device and to adjust the virtual 3D model displayed on the display according to the user input.

3. The system of claim 1, wherein each pixel of the virtual 3D model is georeferenced to a corresponding coordinate location in three dimensional space of a point in the zone.

4. The system of claim 1, wherein the processor is further configured to overlay a first camera location marker on the virtual 3D model at a point corresponding to a georeference location of the first camera location.

5. The system of claim 1, wherein the processor is further configured to overlay a first monitored area marker on the virtual 3D model to designate the first monitored area.

6. The system of claim 5, wherein the first monitored area marker is a wireframe pyramid designating the view angle of the first camera, wherein a base of the pyramid is positioned on the 3D model corresponding to the georeferenced location of the first monitored area and an apex of the pyramid is positioned on the 3D model corresponding to the first camera location.

7. The system of claim 1, wherein the video stream is streamed live from the first camera to the processor, and the processor is configured to overlay the live streaming video of the first monitored area on the virtual 3D model.

8. The system of claim 1, further comprising a second camera at a second location configured to provide a video stream of a second monitored area, wherein a geo-referenced location of the second monitored area is known, and wherein the processor is further configured to receive the video stream of the second monitored area and to overlay the video stream of the second monitored area onto a part of the virtual 3D model that corresponds to the georeferenced location of the second monitored area.

9. The system of claim 8, wherein the virtual 3D model is interactive; and
    wherein the processor is configured to receive the input from the user via a user interface device and to adjust the virtual 3D model displayed on the display according to the user input such that the user can navigate through the virtual 3D model to view the video stream of the first monitored area or the video stream of the second monitored area.

10. A method of monitoring an area, the method comprising:
   video recording a first monitored area with a first video camera at a first camera location;
   determining georeference coordinates for the first monitored area;
   accessing a virtual 3D model of a monitored zone with a processor, wherein the monitored zone includes the first camera location and the first monitored area, and wherein both the virtual 3D model and pixels of the video recording are georeferenced to a physical location of the monitored zone;
   continuously overlaying on a pixel by pixel basis the video recording of the first monitored area onto the virtual 3D model using the processor, wherein the video recording of the first monitored area is overlaid on a part of the virtual 3D model that corresponds to the georeferenced pixels for the first monitored area; and
   displaying on a display the virtual 3D model of the monitored zone overlaid with the video recording of the first monitored area;
   displaying camera location markers on respective parts of the virtual 3D model, said markers corresponding to other cameras monitoring respective areas and providing respective video recordings for continuously overlaying onto the respective parts of the 3D model corresponding to respective georeferenced coordinates for the respective areas;
   selectively displaying one of the virtual 3D model of the monitored zone and the respective parts of the 3D model overlaid with a corresponding video recording.

11. The method of claim 10, wherein each pixel of the virtual 3D model is georeferenced to a coordinate location in three dimensional space of a point of the monitored zone.

12. The method of claim 10, wherein the determining the georeference coordinates for the first monitored area includes determining a coordinate location in three dimensional space of a portion of the first monitored area.

13. The method of claim 10, wherein the determining the georeference coordinates for the physical location of the first monitored area includes assigning a coordinate location in three dimensional space to each pixel of the video recording of the first monitored area.

14. The method of claim 10, further comprising receiving input from a user at a user interface device; and
   adjusting the virtual 3D model displayed on the display according to the user input so as to allow the user to navigate in the virtual 3D model such that the video recording is visible from the georeferenced coordinates corresponding to the first monitored area.

15. The method of claim 10, wherein the video recording of the first monitored area is streamed live from the first video camera to the processor, and wherein the overlaying the video recording of the first monitored area includes continuously overlaying the streamed live video onto the virtual 3D model at another location different from georeferenced coordinates corresponding to the first monitored area.

16. The method of claim 10, further comprising:
   video recording a second monitored area with a second video camera at a second location;
   determining georeference coordinates for the second monitored area;
   wherein the monitored zone further includes the second camera location and the second monitored area; and
   wherein the step of overlaying the video recording further includes overlaying the video recording of the second monitored area onto the virtual 3D model using the processor, wherein the video recording of the second monitored area is overlaid on a second respective part of the virtual 3D model that corresponds to the georeferenced coordinates for the second monitored area; and
   wherein the step of displaying further includes displaying the virtual 3D model of the monitored zone overlaid with the video recording of the second monitored area.

17. The method of claim 16, further comprising determining georeference coordinates for the
   first camera location and the second camera location and underlying camera location markers on the virtual 3D model using the processor, wherein the camera location markers are overlaid on parts of the virtual 3D model that corresponds to the georeference coordinates for the first camera location and the second camera location.

18. The method of claim 17, wherein the camera location markers further include a wireframe outlining the view angles of the first camera and the second camera.

19. The method of claim 17, wherein the camera location markers are selectable by a user via a user interface device; and
   wherein the method further comprises overlaying the video recording of the first monitored area and the second monitored area onto the virtual 3D model based on the camera location marker selected by a user.

* * * * *